Figure 1:
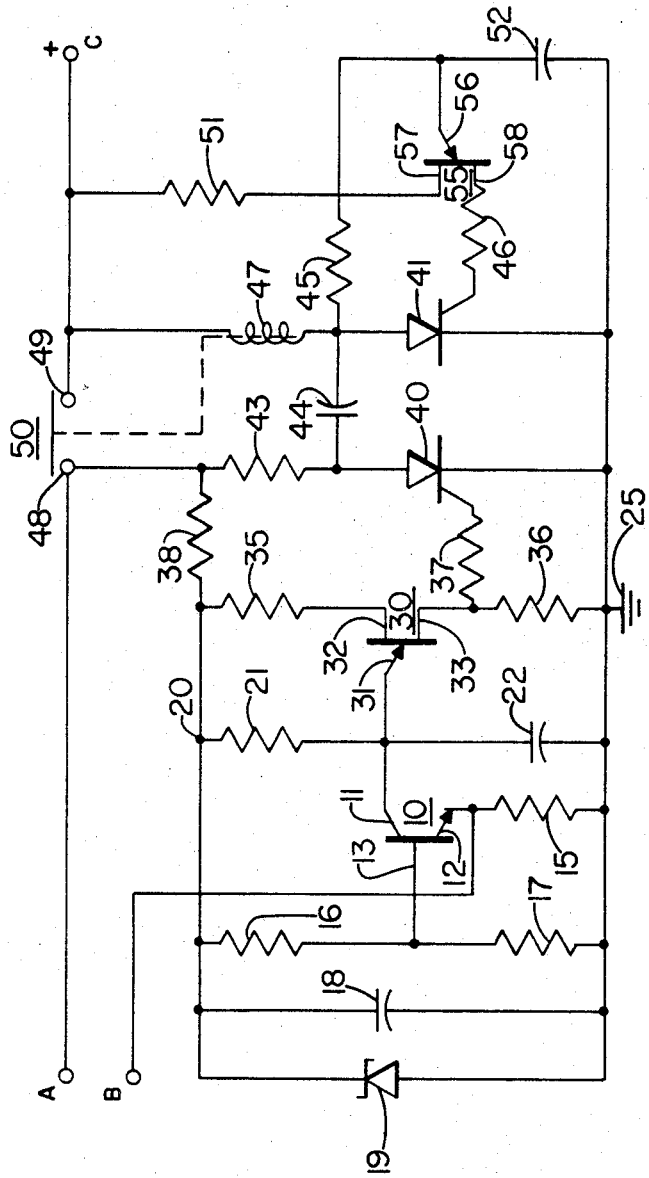

Nov. 26, 1968   L. V. WESTBROOK   3,413,520
SOLID STATE MOTOR CONTROL CIRCUIT
Filed Nov. 10, 1966   2 Sheets-Sheet 1

INVENTOR.
LOWELL V. WESTBROOK
BY
Roger W. Jensen
ATTORNEY

INVENTOR.
LOWELL V. WESTBROOK

United States Patent Office 3,413,520
Patented Nov. 26, 1968

3,413,520
SOLID STATE MOTOR CONTROL CIRCUIT
Lowell V. Westbrook, Excelsior, Minn., assignor to Honeywell Inc., Minneapolis, Minn., a corporation of Delaware
Filed Nov. 10, 1966, Ser. No. 593,432
8 Claims. (Cl. 317—13)

The present invention pertains to improvements in solid state motor control circuits. More particularly, the present invention provides an overload safety protection circuit for use in combination with a solid state motor control circuit in which SCR bridge is constructed around the motor armature to provide the control over the direction of the motor rotation.

Because of the fast "turn-off" and "turn-on" time plus the high current carrying capability of the contemporary SCR's (Silicon Controlled Rectifiers), SCR's lend themselves to application in motor control circuits. Even at high current levels a very high degree of efficiency can be obtained. As with conventional silicon diodes, the very low forward conduction resistance due to an avalanche effect reduces the power dissipated in the SCR's to a very low value.

The use of SCR's, however, presents a basic control problem. This problem is caused by the fact that an SCR is turned into conduction, the gate loses its control and other means must be provided to return the SCR into its nonconducting state. In order to turn an SCR off, the current through it must be reduced below a certain level for a minimum period of time. This can be accomplished by discharging a capacitor across the SCR in the reverse direction.

In a typical motor control circuit, the direction of motor rotation is determined by four SCR's which form a bridge around the motor armature. For rotation in a first direction, a first pair of SCR's are turned on; for rotation in the opposite direction a second pair of SCR's are turned on and the first pair is turned off. Commutating circuit with commutating SCR is provided to control the current to the motor. By turning off the current to the motor, the commutating circuit automatically also turns off the conducting SCR's. When the commutating circuit turns the current to the motor on, it simultaneously also turns on the appropriate pair of SCR's in the bridge circuit.

The commutating circuit also charges and discharges an energy storing capacitor. The turn-off condition is initiated by discharging the capacitors across the commutating SCR and reducing the SCR current to a level below the holding current for the required length of time to return the SCR to its blocking state. The commutating circuits determines the amount of average current delivered to the motor and thus gives the motor control circuit full control of the motor armature speed and direction.

During proper operation of the motor control circuit, the current to the motor is pulsed by the commutating circuit. If for some reason the motor control circuit loses control of the motor, the results would be very undesirable. This may happen, for example, if one of the bridge SCR's fails to turn-off. To prevent damage to the motor and to minimize the motor shut-down time, an overload and circuit failure protection circuit is provided. This circuit senses whether the current to the motor is pulsed. If the current is not pulsed, a non-operating condition exists and power is interrupted. In case that there is no component failure, the power is again applied automatically and the proper motor operation restored.

An object of the present invention is to provide an overload and failure protection circuit for a motor control circuit.

For a more specific object of the present invention it provides a means for sensing the current to the motor, to remove the power from the motor when improper operation incurs, and to automatically restore the power to the motor when the cause of the improper operation is rectified.

Figure 2:
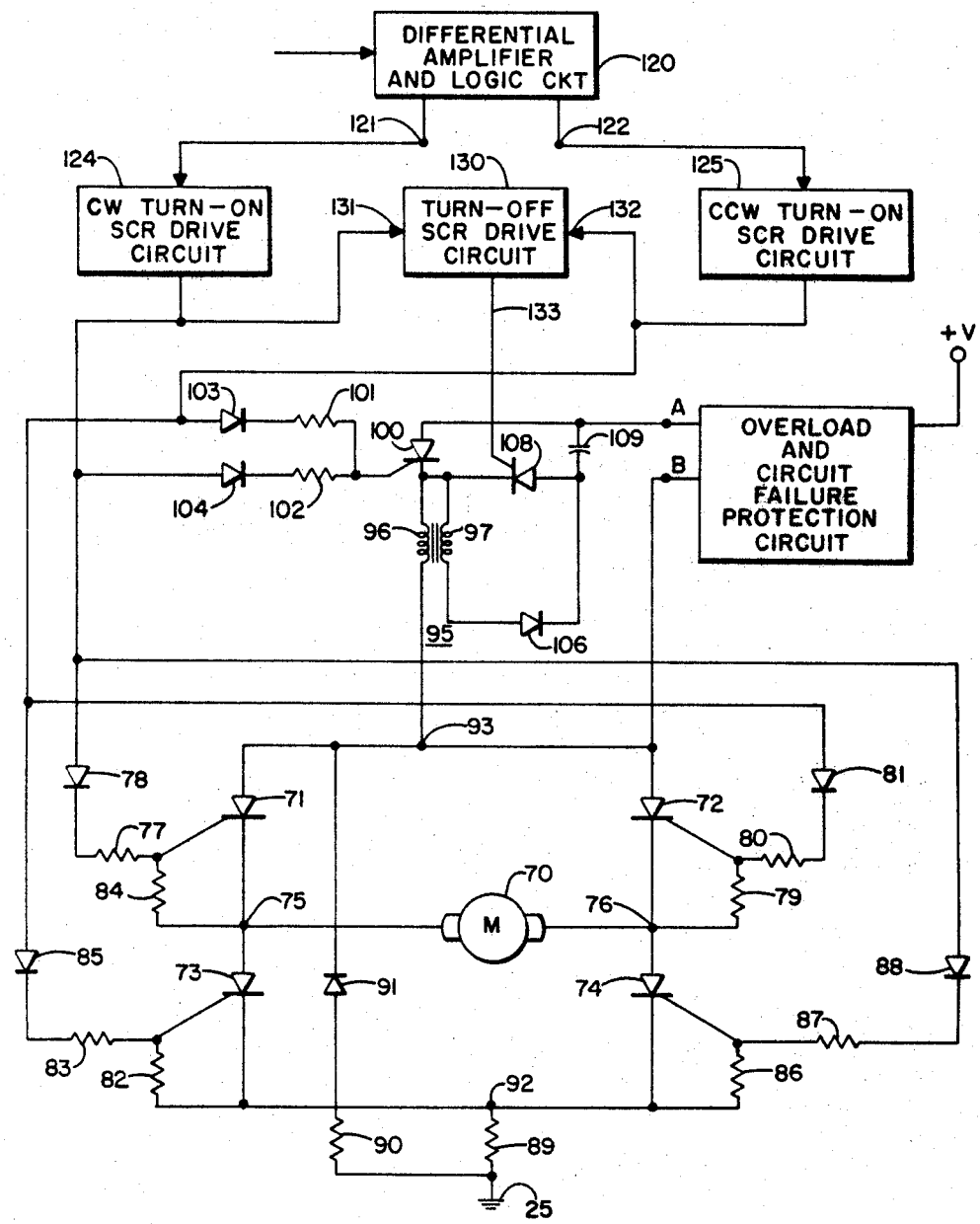

These and further objects will become more apparent to those skilled in the art upon consideration of the following specification, claims and drawings, in which:

FIGURE 1 is a schematic circuit diagram of the overload and circuit failure protection system; and FIGURE 2 is an illustration of the overall motor control circuit wherein the overload and circuit failure protection circuit of the present invention may find best application.

Referring now to FIGURE 1, the overload and circuit failure protection circuit is provided with terminals A and B for connection to a motor control circuit as illustrated in FIGURE 2, and terminal C for connection to a voltage supply source. Transistor 10 is shown with collector 11, and emitter 12, and a base 13. Emitter 12 of transistor 10 connected to terminal B and also to a ground potential terminal 25 through a resistor 15. Base electrode 13 is connected to ground potential 25 through a resistor 17 and to a junction point 20 through a resistor 16. A capacitor 18 and zener diode 19 are connected in parallel between ground potential terminal 25 and junction point 20. The zener diode 19 has its anode connected to ground terminal 25 and its cathode to junction point 20. A resistor 21 is connected between junction point 20 and collector 11, and a capacitor 22 is connected between collector 11 and ground potential terminal 25. Collector 11 is further connected directly to emitter electrode 31 of a unijunction transistor 30.

Unijunction transistor 30 also has a base electrode 32 and a base electrode 33. Base electrode 32 is connected to junction point 20 through a resistor 35 and base electrode 33 is connected to ground potential terminal 25 through a resistor 36 and to the gate electrode of silicon controlled rectifier 40 through a resistor 37.

A relay 50 is shown with contacts 48 and 49. Relay 50 is energized through a winding 47. A resistor 38 is connected between junction point 20 and contact 48 of relay 50. A contact 48 is also connected directly to terminal A, while contact 49 is connected directly to terminal C and power supply source. A resistor 43 is connected between the anode of the silicon controlled rectifier 40 and contact 48 of relay 50. The anode of relay 50 is further connected, through a resistor 44, to the anode of a silicon controlled rectifier 41. The cathodes of both silicon controlled rectifiers 40 and 41 are connected directly to ground potential terminal 25. The relay energizing winding 47 is connected between the anode of silicon controlled rectifier 41 and terminal C. The anode of silicon controlled rectifier 41 is further connected to an emitter electrode of a unijunction transistor 55 by means of a resistor 45.

Unijunction transistor 55 further has a first base 57 and a second base 58. A resistor 46 connects base 58 of unijunction transistor 55 to the gate of silicon controlled rectifier 41. A capacitor 52 is connected between emitter 56 of unijunction transistor 55 and ground potential terminal 25. Base 57 of unijunction transistor 55 is connected to positive potential terminal C through a resistor 51.

Referring now to FIGURE 2, there is shown a silicon controlled rectifier bridge comprised of silicon controlled rectifiers 71, 72, 73 and 74. The motor 70 is connected along one diagonal of the bridge between junction point 75 and 76. Electric power is applied across the other diagonal of the bridge between junction points 92 and 93. SCR's 71 and 72 have their anodes connected to junction point 93 and have their cathodes connected to junction points 75 and 76 respectively. SCR's 73 and 74 have their cathodes connected to junction point 92 and have their anodes connected to junction points 75 and 76 respectively. Junction point 92 is connected to ground potential terminal 25 through a resistor 89. Ground potential terminal 25 is further connected to junction point 93 through a series path of resistor 90 and diode 91. Diode 91 is oriented for forward current flow from ground terminals 25 to junction point 93.

A resistor 84 is connected between the gate and the cathode electrodes of SCR 71, a resistor 79 is connected between the gate and the cathode electrodes of SCR 72, resistor 82 is connected between the gate and cathode electrodes of SCR 73, and a resistor 86 is connected between the gate and the cathode electrodes of SCR 74.

Junction point 93 is connected to a positive potential source through winding 96 of a transformer 95 and an SCR 100. Winding 96 is connected between junction point 93 and the cathode electrodes of SCR 100. The anode electrodes of SCR 100 is connected to terminal A of the overload and circuit failure protection circuit which is illustrated in detail in FIGURE 1. Transformer 95 further has a secondary winding 97. Winding 97 is connected between the cathode electrode SCR 100 and the anode of a diode 106. The cathode of diode 106 is connected to the anode electrode of SCR 108. The cathode electrode of SCR 108 is connected to the cathode electrode of SCR 100. A capacitor 109 is connected between the anode electrodes of SCR 100 and 108. Terminal B of the overload and circuit failure protection circuit is connected to the top of the SCR bridge at junction 93.

The speed and direction of rotation of motor 70 is determined by the polarity of input signal to a differential amplifier and logic circuit 120. Circuit 120 has a pair of output terminals 121 and 122. Output terminal 121 is connected to an input of a clock-wise turn-on SCR drive circuit 124 and output 122 of circuit 120 is connected to the input of a counter-clockwise turn-on SCR drive circuit 125.

The output of clockwise SCR drive circuit 124 is connected to the gate electrode of commutating SCR 100 through a series combination of a diode 104 and a resistor 102. The output of SCR drive circuit 124 is further connected to the gate electrode of SCR 71 of the bridge circuit through a series combination of a diode 78 and a resistor 77, and it is further connected to the gate electrode of bridge SCR 74 through a series combination of a diode 88 and a resistor 87. Diodes 104, 78, and 88 are oriented for forward current flow from output of drive circuit 124 to the respective gate electrodes. The output of counter-clockwise turn-on SCR drive circuit 125 is connected to the gate electrode commutating SCR 100 through a series combination of a diode 103 and a resistor 101. The output of drive circuit 125 is also connected to the gate electrode of bridge SCR 72 to a series combination of a diode 81 and a resistor 80, and is further connected to bridge SCR 73 through series combination of diode 85 and a resistor 83. Diodes 103, 81, and 85 are oriented for forward current flow from the output of SCR drive circuit 125 to the respective gate electrodes.

The output of the turn-on SCR drive circuit 124 is also connected to an input 131 of a turn-off SCR drive circuit 130. Turn-off drive circuit 130 further has an input 132 and an output 133. Input 132 of circuit 130 is connected to the output of counter-clockwise turn-on drive SCR circuit 125. Output 133 of turn-off drive SCR circuit 130 is connected to the gate electrode SCR 108.

For better understanding of the operation of the apparatus of FIGURE 1 it is beneficial to first investigate briefly the operation of FIGURE 2 and the role of the overload and failure protection circuit of FIGURE 1 in the overall system of FIGURE 2.

The proper timing of the turn-on signal to the various gate electrodes of the various SCR's is provided by the control circuit. The detailed description of the control circuitry is not given here because it is not necessary for the understanding of the present invention.

The control circuitry provides a pulse control for DC motor 70. For rotation in a clockwise direction, a first pair of SCR's 71 and 74 are turned on in conjunction with the commutating SCR 100. For rotation in the counter-clockwise direction, a second pair of SCR's 72 and 73 are turned on and the first pair is turned off. Commutating SCR 100 controls the current to the motor. By turning off the current to the motor, the commutating circuit automatically also turns off the conducting SCR's. When the commutating circuit turns the current to the motor on, it simultaneously also turns on the appropriate pair of SCR's in the bridge circuit.

An energy storing capacitor 109 is incorporated into the commutating circuit. The turn-off condition is initiated by discharging capacitor 109 across commutating SCR 100 and reducing the SCR current to a level below the holding current for the required length of time to return the SCR to its blocking state.

During normal operation of the motor control circuit, the current to the motor applied at the top of the SCR bridge is pulsed. A failure in the circuit operation, such as the failure of one of the SCR's to turn off, will interrupt the pulsating of the current and may result in damage to the motor. To safeguard against this possibility, the overload and failure protection circuit is provided by the present invention. This circuit senses the current at the top of the bridge. If the current is pulsed, normal operation exists and the protection circuit will remain inactive. If, however, the current is not pulsed, the protection circuit is activated to remove the power from the motor and to automatically reapply the power if and when the failure is corrected.

As shown in FIGURE 2, terminal B of the protection circuit is connected directly to the top of the SCR bridge and is maintained at the potential of junction 93. When the motor control circuit is operating properly, the potential at junction B will be pulsed.

When power is applied, transistor 10 is turned on. The proper base drive current and voltage for transistor 10 is obtained from the proper selection of resistors 16 and 17. If no voltage is present at point B transistor 10 remains in the conducting state and capacitor 22 cannot charge up. If a pulsating DC voltage appears at point B transistor 10 will be turned off for the length of time the pulse appears at point B. The capacitor 22 will charge as long as transistor 10 is not conducting. The time required for capacitor 22 to charge up to the peak voltage of unijunction transistor 30 is governed by the values of resistor 21 and capacitor 22 and is adjusted to be slightly longer than the longest pulse to be seen at point B during normal operation. If the pulse at point B is of normal duration transistor 10 will turn on when the pulse disappears and capacitor 22 will discharge. If a malfunction occurs and the pulse at point B is longer than usual, capacitor 22 will charge up to the peak voltage of transistor 30 and transistor 30 will fire.

During normal operation capacitor 44 is charged to line voltage. The charging path is from point 48 through resistor 43, capacitor 44, and SCR 41. The charge on the capacitor is such that the plus is on the anode of SCR 40 and the minus is on the anode of SCR 41. When transistor 30 fires, gate current is applied to the gate of SCR 40 through resistor 37, and SCR 40 is turned on. When SCR 40 turns on, the voltage on capacitor 44 is applied to SCR 41. This voltage is of sufficient magnitude and polarity to turn off SCR 41. Current is removed from winding 47 causing relay 50 to drop out and remove power from terminal A.

Since the defect in the control circuit causing the malfunction may be only temporary, such as the failure of one of the bridge SCR's to turn off, the defect may correct itself after temporary interruption of electric power. The present invention provides means for automatically reapplying the power after a predetermined period of time, whereupon the normal operation of the motor may be restored with a minimum amount of delay. As relay 50 is opened, the power is removed from transistor 10, unijunction transistor 30, and silicon controlled rectifier 40. A current path, however, may still be traced from positive potential terminal C through winding 47, resistor 45 and through capacitor 52 to the ground potential terminal 25. This current through winding 47 is not sufficiently large to close relay 50. It does, however, charge up capacitor 52 until it exceeds the peak voltage of unijunction transistor 55. Thereupon current and voltage from capacitor 52 is applied through resistor 46 to the gate of SCR 41, rendering SCR 41 conductive. Sufficient current is again directed through winding 47 to energize relay 50 and thus reapply the power to terminal A. The operation of the motor will be resumed. If the failure persists, the overload and failure protection circuit will repeat the entire cycle and will continue repeating it until proper operation of the motor is restored or the system is turned off. The recycling period is determined by the values of resistor 45 and capacitor 52.

While I have shown a particular embodiment of the present invention, other modifications and improvements will become obvious to those skilled in the art. It is, therefore, understood that the specific embodiment of my invention shown here is for the purpose of illustration only, and that my invention is limited only by the scope of the appended claims.

1. A pulse sensing and failure protection circuit comprising:
   a source of electric potential;
   pulse generating means;
   switching means having a first terminal connected to said source of electric potential and a second terminal connected to said pulse generating means, and further having a control means responsive to an electric signal to close and open the electric path between said first and second terminals;
   pulse detecting means connected to said pulse generating means for sensing the pulsing signal; and
   means connected to said pulse detecting means and to said control means of said switching means to open the current path between said first and second terminals to interrupt the power flow from said source when the signal produced by said generating means is not pulsing and to automatically close the switch and reapply the power after a predetermined period of time.

2. An overload and failure protection circuit for a DC motor pulse controlled by motor controller logic, said circuit comprising:
   a first terminal for connection to a source of electric potential, a second terminal connected to said motor controlled logic, and a common terminal;
   a normally closed relay having a first contact connected to said first terminal and having a second contact connected to said second terminal, one of said contacts being stationary and the other being movable;
   said relay further having a control means responsive to an electric signal to open and close the electric path between said first and second terminals;
   pulse detecting means connected to said motor for sensing the pulsating control signal provided to motor by said motor controller logic and to provide an output when said control signal ceases to pulsate;
   relay disengaging means connected to said pulse detecting means and to said control means of said relay to open said relay and interrupt the power flow from said source of electric potential when the signal provided to the motor is not pulsating; and
   further means connected to said relay control means to automatically close said relay and reapply the power after a predetermined period of time.

3. Apparatus according to claim 2 wherein said pulse detecting means includes:
   a capacitor having a first end connected to said second terminal and a second end connected to said common terminal;
   a first semiconductor switching means connected across said capacitor and to said motor controller logic for periodically discharging said capacitor in response to the pulsating signal provided to said motor; and
   a unijunction transistor having an emitter connected to said first end of said capacitor, a first base connected to said second terminal, and a second base connected to said common terminal through an impedance.

4. Apparatus according to claim 2 wherein said relay control means includes a winding and wherein said relay disengaging means includes:
   a normally conductive second semiconductor switching means connecting the control winding of said relay between said first and said common terminals, said switching means further being connected to said output of said pulse detecting means, whereby a signal from said pulse detecting means is operative to render said second switching means nonconductive.

5. Apparatus according to claim 2 wherein said further means includes a second capacitor and a resistor in series between said first and said common terminals and a unijunction transistor having one base connected to said first terminal, having its emitter connected to one end of said second capacitor, and having its other base connected to said second switching means to render said second switching means conductive after a predetermined period of time, said period of time being determined by the values of said series combination of said second capacitor and said resistor.

6. Apparatus according to claim 3 wherein said relay control means includes a winding and wherein said relay disengaging means includes:
   a normally conductive second semiconductor switching means connecting the control winding of said relay between said first and said common terminals, said switching means further being connected to said output of said pulse detecting means, whereby a signal from said pulse detecting means is operative to render said second switching means nonconductive.

7. Apparatus according to claim 3 wherein said further means includes a second capacitor and a resistor in series between said first and said common terminals and a unijunction transistor having one base connected to said first terminal, having its emitter connected to one end of said second capacitor, and having its other base connected to said second switching means to render said second switching conductive after a predetermined period of time, said period of time being determined by the values of said series second capacitor and resistor.

8. Apparatus according to claim 6 wherein said further means includes a second capacitor and a resistor in series between said first and said common terminals and a unijunction transistor having one base connected to said first terminal, having its emitter connected to one end of said second capacitor, and having its other base connected to said second switching means to render said second switching means conductive after a predetermined period of time, said period of time being determined by the values of said series second capacitor and resistor.

References Cited

UNITED STATES PATENTS

| | | |
|---|---|---|
| 2,924,724 | 2/1960 | Booker. |
| 3,133,230 | 5/1964 | Glassburn _____ 317—36 |
| 3,325,718 | 6/1967 | McNulty _____ 317—33 X |
| 3,365,675 | 1/1968 | Gaddy et al. _____ 317—33 X |

JOHN F. COUCH, *Primary Examiner.*

J. D. TRAMMELL, *Assistant Examiner.*